US008009405B2

(12) United States Patent
Gefter et al.

(10) Patent No.: US 8,009,405 B2
(45) Date of Patent: Aug. 30, 2011

(54) LOW MAINTENANCE AC GAS FLOW DRIVEN STATIC NEUTRALIZER AND METHOD

(75) Inventors: Peter Gefter, South San Francisco, CA (US); Lawrence Levit, Alamo, CA (US); Leslie Partridge, Davis, CA (US); Scott Gehlke, Berkeley, CA (US)

(73) Assignee: Ion Systems, Inc., Alameda, CA (US)

( * ) Notice: Subject to any disclaimer, the term of this patent is extended or adjusted under 35 U.S.C. 154(b) by 611 days.

(21) Appl. No.: 12/049,350

(22) Filed: Mar. 16, 2008

(65) Prior Publication Data

US 2008/0232021 A1 Sep. 25, 2008

Related U.S. Application Data

(60) Provisional application No. 60/918,512, filed on Mar. 17, 2007.

(51) Int. Cl.

| | |
|---|---|
| ***H05F 3/00*** | (2006.01) |
| ***H05F 3/04*** | (2006.01) |
| *H01T 23/00* | (2006.01) |
| *H01G 7/02* | (2006.01) |

(52) U.S. Cl. ........ 361/213; 361/230; 361/231; 361/232; 361/233

(58) Field of Classification Search .................. 361/213
See application file for complete search history.

(56) References Cited

U.S. PATENT DOCUMENTS

| | | | | |
|---|---|---|---|---|
| 4,689,715 | A * | 8/1987 | Halleck | 361/213 |
| 5,116,583 | A | 5/1992 | Batchelder et al. | |
| 5,249,094 | A | 9/1993 | Hayakawa et al. | |
| 5,535,089 | A | 7/1996 | Ford et al. | |
| 6,693,788 | B1 | 2/2004 | Partridge | |
| 6,850,403 | B1 * | 2/2005 | Gefter et al. | 361/230 |
| 7,177,133 | B2 | 2/2007 | Riskin | |
| 7,180,722 | B2 | 2/2007 | Jacobs et al. | |
| 7,375,944 | B2 | 5/2008 | Izaki et al. | |
| 7,649,728 | B2 | 1/2010 | Fujita et al. | |

OTHER PUBLICATIONS

Young, Lee; PCT/US08/03488 International Search Report; ISA/US; Jun. 9, 2009, pp. 1-2, US.

* cited by examiner

*Primary Examiner* — Dharti H Patel
(74) *Attorney, Agent, or Firm* — Stephen R. Uriarte

(57) ABSTRACT

A low maintenance AC gas-flow driven static neutralizer, comprising at least one emitter and at least one reference electrode; a power supply having an output electrically coupled to the emitter(s) and a reference terminal electrically coupled to the reference electrode(s) with the power supply disposed to produce an output waveform that creates ions by corona discharge and to produce an electrical field when this output waveform is applied to the emitter(s); a gas flow source disposed to produce a gas flow across a first region that includes these generated ions and the emitter(s), the gas flow including a flow velocity; and wherein, during a first time duration, the output waveform decreases an electrical force created by the electrical field, enabling the gas flow to carry away from the emitter(s) a contamination particle that may be located within a second region surrounding the emitter(s), and to minimize a likelihood of the contamination particle from accumulating on the emitter(s). The first region may include the second region.

29 Claims, 7 Drawing Sheets

LOW MAINTENANCE AC GAS FLOW DRIVEN STATIC NEUTRALIZER AND METHOD

CROSS-REFERENCE TO RELATED APPLICATIONS

This application claims the benefit of U.S. Provisional Application having Ser. No. 60/918,512, filed 17 Mar. 2007.

BACKGROUND OF THE INVENTION

1. Field of the Invention

This invention relates to static neutralizers, sometimes commonly referred to as static-charge neutralizers. More particularly, this invention relates to low maintenance alternating-current (AC) gas flow driven static neutralizers that reduce or eliminate electrode contamination by limiting, preventing or reducing particle accumulation on the surface(s) of their respective emitter(s).

2. Background Art

A static neutralizer is commonly employed to reduce or eliminate electro-static charges that accumulate on or near electro-static sensitive items, such as flat panel displays, electronic circuits, and other items that may be damaged by the discharge of these electro-static charges. To reduce or eliminate these electro-static charges, a static neutralizer creates ions of opposite polarity, which when directed towards an area having a static charge, neutralize the static charge.

A static neutralizer creates these ions by applying a large voltage, named ionizing voltage, to at least one ion emitter, commonly referred to as an emitter or ionizing electrode. Each emitter is located in proximity to at least one reference electrode, which may be in the form of either an emitter receiving a voltage of opposite polarity or a grounded electrode. Either type of reference electrode serves to terminate the electric field from the emitter(s). Each emitter and its corresponding reference electrode(s) generate both polarity ions in the surrounding air or gas media when a sufficient voltage is maintained across the emitter and its corresponding reference electrode. An emitter and its corresponding reference electrode(s) may be referred to as an ionizing cell. This ionizing voltage produces a high voltage gradient that in turn creates an electric field near each emitter used and when this voltage exceeds the corona threshold voltage for the ionizing cell, a corona discharge results that creates ions.

The corona threshold is sometimes called the corona onset voltage for the emitter. For a wire or filament-type emitter, the corona threshold voltage is typically (+) 5-6 kV for positive and (−) 4.5-5.5 kV for negative ionizing voltages. For point-type emitters the corona onset voltage is typically 1-1.5 kV lower for both polarities. These corona onset voltage values, however, are generally applicable only to clean emitters.

It is well known in the art that an emitter accumulates particles and airborne molecular contamination from the environmental air or gas. In addition to creating ions, each emitter also are functions as an electrostatic precipitator. Attracting and collecting contamination on an emitter is a consequence of corona discharge in open air. The accumulation of contamination on an emitter changes the emitter's geometry and raises its corona onset voltage. A contaminated emitter exhibits significantly lower efficiency and disrupts the balance of generated positive and negative ions, named "ion balance", which in turn, reduces the performance of the AC static neutralizer.

In addition, static neutralizers that apply an AC high voltage waveform with a frequency in the $10^3$-$10^5$ Hz range to an ionizing cell sometimes suffer from high ion recombination or ion loss rates. At these frequencies, which are within the range of frequencies commonly associated with radio frequencies (RF), when the waveform of one polarity is applied to the ionizing electrode, most of the corona-generated ions of the same polarity are repelled from the electrode. Although they have enough time to move away from ionizing electrode, they cannot travel far enough to reach the low voltage or reference electrode before the waveform polarity reverses. When the polarity reverses, the same movement occurs for the other polarity of ions. Therefore a bipolar ion cloud can be formed predominantly in the central part of the gap between ionizing or ion emitting and reference electrodes. Formation of this cloud occurs for an applicable set of ion mobility, voltage amplitude and frequency values, as previously disclosed in U.S. Pat. No. 7,057,130.

These types of static neutralizers that employ a high voltage high frequency AC waveform provide a very efficient air or gas ionization and create bipolar ion clouds having high ion concentration. Electrical fields oscillating in the RF range, however, do not expel the ions and move them to the charged object. To solve this problem, these static neutralizers employ an air or gas moving means, such as a blower, fan, or compressed gas expelled through at least one nozzle, to drive these ions towards an object selected for charged neutralization.

This gas flow solution suffers from the disadvantage of increasing the rate of accumulation of unwanted particle contaminant on the emitter, such as on its body or emitter point, because of the increased airflow through the gaps in the ionizing cell. This accumulation affects emitter geometry and raises emitter corona onset voltage, which decreases real time ion production and the efficiency of the static neutralizer.

One solution includes providing clean or uncontaminated air or gas for gas flow driven static ionizers. However, this solution may be difficult or expensive to accomplish, especially in large manufacturing environments where the ionization cell is exposed to ambient air.

Another solution, as taught in U.S. Pat. Nos. 4,734,580 and 5,768,087, includes using a manual or automatic brush for cleaning the emitters of a static neutralizer. This method of mechanical cleaning is effective, but requires additional mechanical parts and, in some cases, increases emitter contamination if the manual or automatic client brush is not maintained so that it remains cleaner than the emitter being cleaned.

Another solution involves using special clean dry air (CDA) or inert gas flow (for example nitrogen) to create a protective gas sheath surrounding a tip of an emitter, which is disclosed in U.S. Pat. No. 5,847,917 and published in United States patent application 2006/0193100). This method is expensive and has limited application to static neutralizers that employ nozzles with pointed emitters.

FIG. 1 shows a schematic view of a known DC static neutralizer 2 that generates a bipolar ion cloud (not shown) and which is disclosed in U.S. Pat. Nos. 5,055,963 and 6,118,645 and published United States patent application 2003/0218855. This type of system requires two very stable high voltage DC power supplies 4*a* and 4*b* that separately provide ionizing voltages 6*a* and 6*b*, which are of different polarities at constant voltage magnitudes +U and −U, to at least two emitters 8*a* and 8*b*, and as such, is relatively costly to manufacture and maintain. This type of DC static neutralizer suffers from a relatively high contamination because airborne particles become charged as they approach the ionizing cell

10 and are continuously attracted to the positive and negative emitters 8*a* and 8*b* since they continuously receive their respective ionizing voltages.

FIG. 2 shows a schematic view of a pulsed DC static neutralizer 12 disclosed in U.S. Pat. Nos. 3,711,743; 4,901,194; and 4,951,172. Pulsed DC neutralizer 12 is similar to DC neutralizer 2 but uses a positive power supply 14*a* and a negative power supply 14*b* that respectively provide output waveforms 15*a* and 15*b* to separate emitters 18*a* and 18*b*, sometimes referred to as ionizing electrodes. Output waveforms 15*a* and 15*b* are waveforms that respectively have pulsed ionizing voltages 16*a* and 16*b*, as shown. This type of DC neutralizer has a relatively low ion recombination rate but suffers from a relatively high emitter contamination rate and system complexity.

FIG. 3 illustrates another example of a pulsed DC static neutralizer 20, which is further disclosed in Japanese patent JP2004039352 and United States patent application 2005/0116167, that uses positive and negative high voltage power supplies 21*a* and 21*b* that are periodically switched by a microprocessor (not shown), and their respective two voltages and combined in a summing circuit 22. This low frequency system uses only one high voltage bus 24 for sending the output 25 of summing circuit to all ion emitters, including emitter 26. The rate of accumulation of contaminants on these emitters is approximately the same as for pulsed DC systems, such as pulsed DC neutralizer 12. The output waveforms disclosed in FIGS. 1 and 3 use either DC or slowly or slowly switched DC pulses of less than 5 Hz.

As illustrated in FIG. 4 and disclosed in U.S. Pat. No. 4,757,422 and patent application 2005/0286201, many AC static neutralizers, such as static neutralizer 28 employ a simple line frequency (50-60 Hz) step-up transformer 30 as its high voltage power supply, and typically use a low frequency ionizing output waveform 32 of around 100 Hz or less. These AC static neutralizers are inexpensive, but because of the low frequency ionizing voltage, the step-up transformers are quite large, rendering these static neutralizers bulky. In addition, these types of AC static neutralizers have a contamination rate in excess of pulsed DC neutralizers, such as neutralizers 12 and 20, above.

FIG. 5 illustrates another example of a gas flow-driven AC static neutralizer 34, which is further disclosed in U.S. Pat. No. 6,646,856 and in Japanese patent JP 2004273357. Static neutralizer 34 is shown with two emitters 35*a* and 35*b* per ionization cell 36. Emitters 35*a* and 35*b* receive a high frequency continuous output waveform 37 from a high voltage power supply 38 that has an amplitude sufficient for positive and negative ion generation by corona. This amplitude has a maximum peak-to-peak magnitude that remains fixed and does not vary over time. Static neutralizer 34 also includes an air blower (not shown), and its power supply 37 may be manufactured inexpensively and at a relatively small foot print. Static neutralizer 34, however, suffers from a relatively high contamination rate because its emitters require cleaning approximately every 50 to 100 hours of operation.

Consequently, a need exists for a low maintenance AC gas flow driven static neutralizer that limits, prevents or reduces the accumulation of gas borne contamination particles on its emitter(s).

SUMMARY

A low maintenance AC gas-flow driven static neutralizer, comprising at least one emitter and at least one reference electrode; a power supply having an output electrically coupled to the emitter(s) and a reference terminal electrically coupled to the reference electrode(s) with the power supply disposed to produce an output waveform that creates ions by corona discharge and to produce an electrical field when this output waveform is applied to the emitter(s); a gas flow source disposed to produce a gas flow across a first region that includes these generated ions and the emitter(s), the gas flow including a flow velocity; and wherein, during a first time duration, the output waveform decreases an electrical force created by the electrical field, enabling the gas flow to carry away from the emitter(s) a contamination particle that may be located within a second region surrounding the emitter(s), and to minimize a likelihood of the contamination particle from accumulating on the emitter(s). The first region may include the second region.

DETAILED DESCRIPTION OF THE INVENTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having benefit of the herein disclosure.

The present invention establishes a gas flow at a given flow velocity and uses an ionizing voltage waveform that when applied to at least one emitter, helps drive contamination particles away from the emitter(s) and reduces the rate of accumulation of these contamination particles on the emitter (s). When the gas flow passes through a corona discharge region, the gas flow may contain gas borne contamination particles that are affected by the ions generated by corona discharge and by the high intensity electrical field provided by the ionizing voltage. These ions are subsequently repelled from a region near the emitter(s) and carried by the gas flow towards an object targeted for static charge neutralization, named "target object". Some of these contamination particles, however, may be retained within a region surrounding the emitter(s) due to an electrical force imparted by the electrical field, preventing the gas flow from blowing these contamination particles away from the emitter(s). The present invention prevents or reduces this accumulation by decreasing this electrical force. It is contemplated that the present invention will provide the benefit of reducing emitter particle contamination even in environments that have relatively low airborne particle concentration in ambient air, such as in the semiconductor and flat panel manufacturing and assembly industries, or in the gas used as part of the gas flow source.

Figure 1:
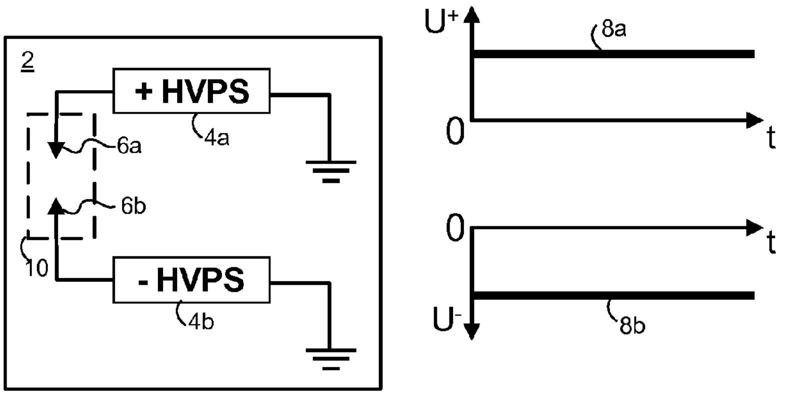
Prior Art FIG. 1
FIGS. 1 through 5 are block illustrations of various prior art static neutralizers and their respective ionizing cells and output voltage waveforms.
Figure 2:
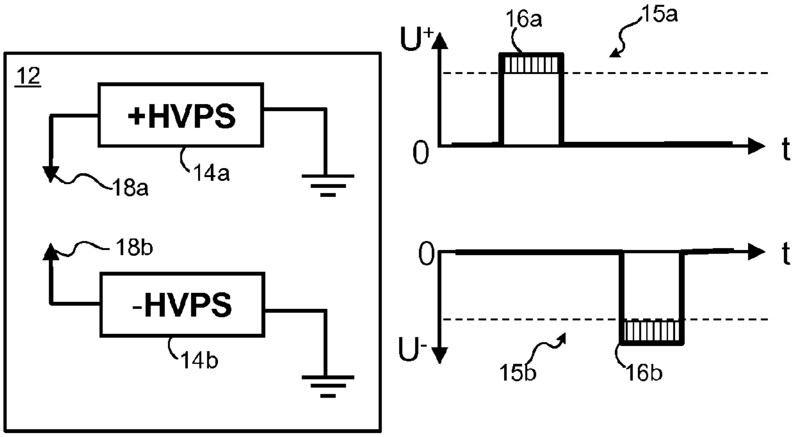
Prior Art FIG. 2
Figure 3:
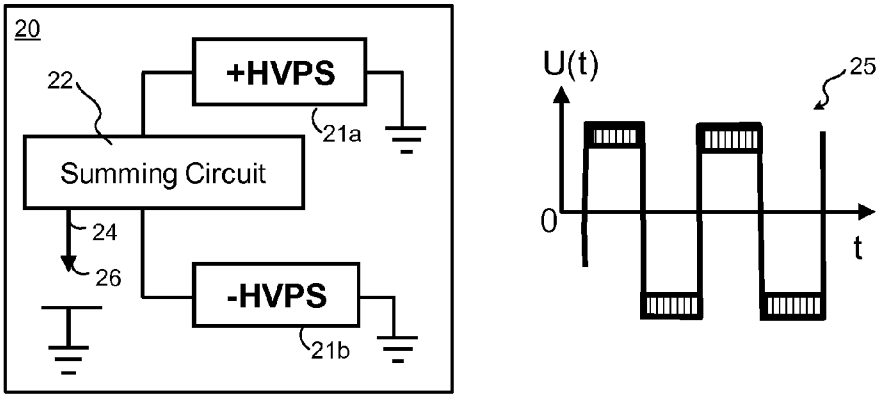
Prior Art FIG. 3
Figure 4:
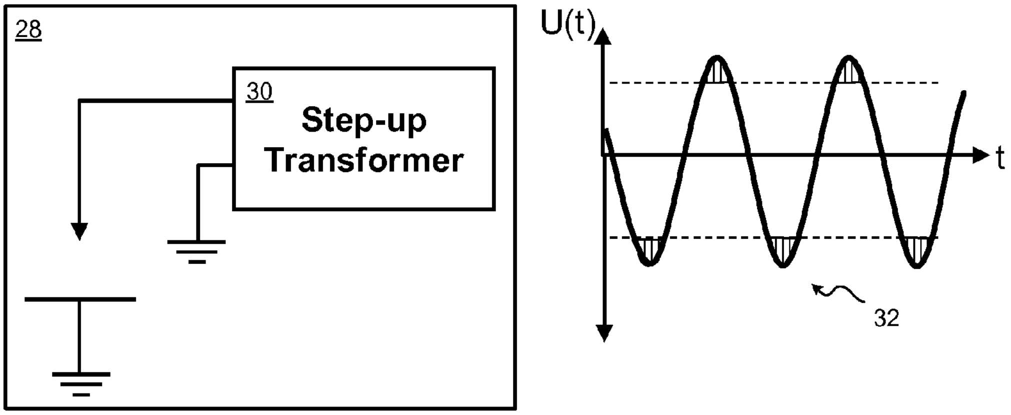
Prior Art FIG. 4
Figure 5:
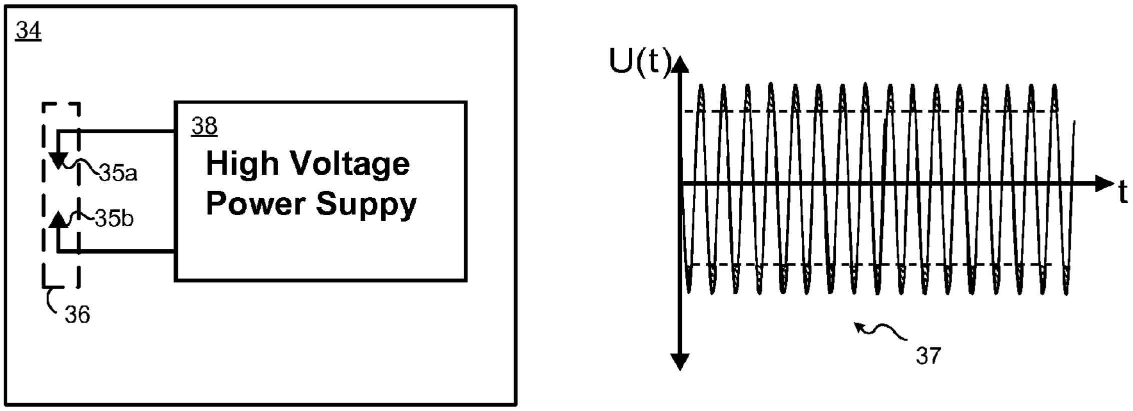
Prior Art FIG. 5
Figure 6:
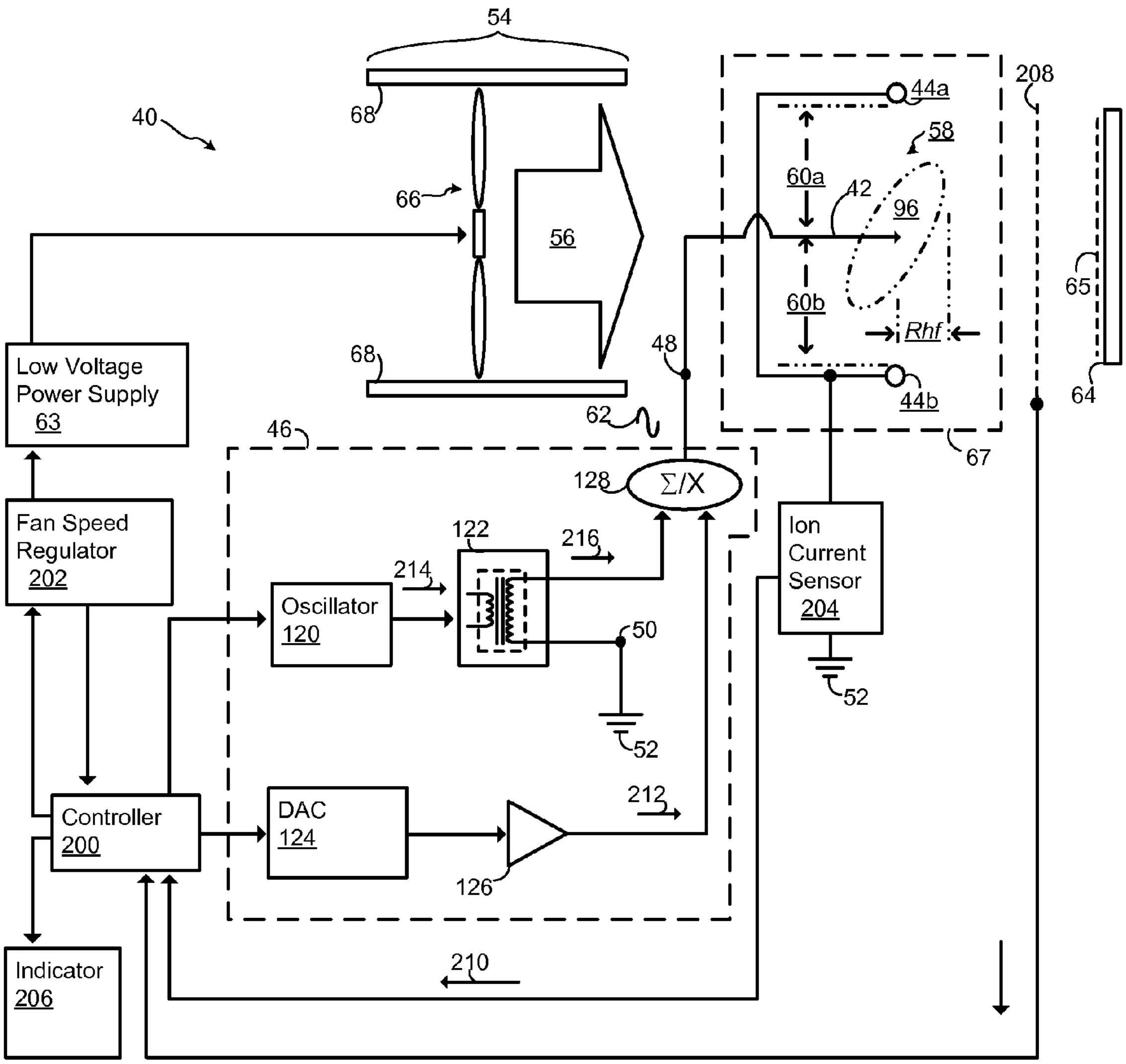
FIG. 6 is a block diagram illustrating an AC gas flow driven static neutralizer having enhanced emitter contamination control in accordance with one embodiment of the present invention.

Referring now to FIG. 6, an emitter contamination-resistant AC gas flow driven static neutralizer 40 is shown in accordance with one embodiment of the present invention. Static neutralizer 40 includes at least one emitter 42 and at least one reference electrode, such as reference electrodes **44*a* and 44*b*; a power supply 46 having a power supply output 48 electrically coupled to emitter 42 and a reference terminal 50 electrically coupled to reference electrodes 44*a* and 44*b* through a reference rail, such as ground 52. Neutralizer 40 also includes a gas flow source 54 that produces a gas flow 56 having a flow velocity across a region 58 near emitter 42. In the example shown, region 58 includes gaps 60*a* and 60*b* that are formed between emitter 42 and reference electrodes 44*a* and 44*b***.

Emitter 42 and reference electrodes **44*a* and 44*b* may be part of an ionizing cell 67 that provides a support structure (not shown) for emitter 42 and reference electrodes 44*a* and 44*b*. Gas flow source 54 may include a fan 66 that receives power from a low voltage power supply 63, and a plenum 68. Fan 66 may be located upstream or downstream from region 58. Using a fan as a gas flow source is not intended to limit the present invention. Any gas flow source may be used that can provide the function of driving a gas so that the gas can assist with the deliver of ions to a target object 64 that has a surcharge 65**. For example, a gas under pressure that exists through a nozzle, a nozzle sheath that covers an electrode concentrically, a plenum with exit apertures, gas-assist ionizing bars or another gas flow sources that are known by those of ordinary skill in the art.

Power supply 46 produces a time-varying output signal, named "output waveform" 62, that functions as an ionizing waveform voltage (P) by creating a set of positively and negatively charged ions by corona discharge, also referred to herein as a "bipolar ion cloud". These bipolar ion clouds (not shown) respectively alternate between emitter 42 and reference electrode **44*a*, and between emitter 42 and reference electrode 44*b*. To create these bipolar ion clouds, output waveform 62 may be configured to have a frequency (Fb) of approximately between 10 KHz to 100 KHz. At these frequencies, the bipolar ion clouds will center at or near the middle of gaps 60*a* and 60*b*, resulting in a relatively high density of ions at or near the middle of gaps 60*a* and 60*b*. The creation of an alternating bipolar ion cloud is known and is further disclosed in U.S. Pat. No. 7,057,130. Increasing the density of ions at or near a region or space through which gas flow 56 is channeled, increases the effectiveness of gas flow 56 to deliver ions to target object 64** and decreases the rate of ion recombination.

In an alternative embodiment, output waveform 62 may have an AC frequency as low as 1 KHz, and thus the lower limit of 10 KHz is not intended to be limiting anyway. Using an output waveform frequency lower than 1 OK is less effective in centering ions near the middle of gaps **60*a* and 60*b*, however, and may reduce the density of ions through which gas flow 56 may predominantly flow and the effectiveness of gas flow 56 in delivering ions to target object 64. Moreover, region 58 is not intended to be limited to the middle of gaps 60*a* and 60*b* but may be any region or space that would enable gas flow 56 to drive generated bipolar ions to target object 64**.

When output waveform 62 is applied to emitter 42, output waveform 62 also creates an electrical field with an intensity at selected time periods which will permit gas flow 56 to remove contamination particles near region 58 and reduce contamination particle accumulation on emitter 42. These ions and electrical field are not depicted in FIG. 6 to avoid over-complicating the drawing.

Figure 7:
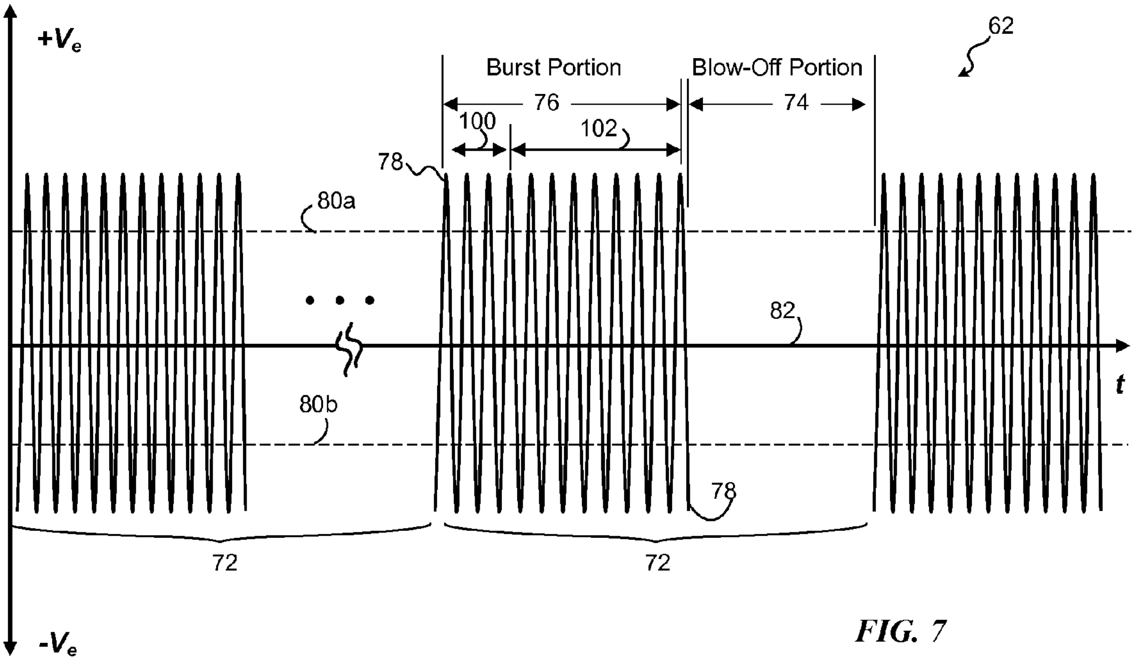
FIG. 7 illustrates an output waveform that enables the production of a bipolar ion cloud and that minimizes the accumulation of contamination particles that may be near an emitter in accordance with another embodiment the present invention.

Referring to FIGS. 6 and 7, output waveform 62 may have a DC offset (Voff), which is not shown, and at least one modulation portion 72, which may also be referred to as a pulse train. Modulation portion 72 includes a blow-off portion 74 and a burst portion 76. Since burst portion 76 in this example is in the form of a pulse train, burst portion 76 may also be referred to as a burst interval. These waveform parameters are selected in order to permit static neutralizer 40 to provide charge neutralization of target object 64, and reduce particle contamination accumulation on emitter 42 as further described below.

During burst portion 76, output waveform 62 has an amplitude (V) 78 that exceeds positive and negative corona onset thresholds **80*a* and 80*b* for a particular emitter, such as emitter 42 in FIG. 6. These thresholds values are not intended to limit the present invention in anyway and depend on the geometry of emitter 42, ion mobility and other factors known by those of ordinary skill in the art. In the embodiment shown, corona onset thresholds 80*a* and 80*b* may have respective amplitudes that range approximately between +/−4 KV and 12 KV. Further, output waveform 62 is shown with a sinusoidal form during burst portion 76. Although using a sinusoidal waveform permits the use of amplitude modulation to generate the shape shown, using a sinusoidal time-varying signal during burst portion 76 is not intended to be limiting but any waveform shape may be used. For example, output waveform 62** may have any suitable waveform shape, including a trapezoidal, saw tooth, square wave, triangular or any combination of these waveform shapes.

During burst portion 76, output waveform 62 also has a frequency, which may hereinafter be referred to as an "output waveform frequency" or "basic frequency" (Fb) that can be set to match a distance to target object 64 and the flow velocity of gas flow 56. This basic frequency may range from approximately between 1 KHz and 100 KHz although in the embodiment shown the basic frequency is limited to a range of approximately between 10 and 80 KHz.

Modulation portion 72 occurs at a burst portion frequency (Fm), which reflects the number of cycles of modulation portion 72 that occur per second. The ratio of the period (Tb) of burst portion 76 and the period of modulation portion 72 (Tm) determines the duty cycle (DM) of output waveform 62, which may be expressed as:

$$Dm=Tb/Tm \qquad (0)$$

Burst portion frequency (Fm) may be selected as disclosed further herein.

Applying output waveform 62 to an emitter, however, creates an electrical field that produces electrical forces that attract these contamination particles toward the operating emitter(s), such as emitter 42, and reduce the ability of a gas flow to carry away these contamination particles from the emitter(s). These electrical forces include a Coulomb force (Fc) and a dielectrophoretic force (Fd). Providing blow-off portion 74 as part of output waveform 62 decreases this electrical field. During blow-off portion 74, output waveform 62 has an amplitude (V), named "non-burst amplitude" 82, that does not exceed corona onset threshold 80*a* and 80*b*. In the example shown, non-burst amplitude 82 has a voltage magnitude of zero during blow-off portion 74. Limiting the magnitude of non-burst amplitude 82, reduces the electrical field that results when output waveform 62 reaches a selected emitter, such as emitter 42. Reducing this electrical field, lessens the Coulomb and dielectrophoretic electrical forces and enables gas flow 56 at a given flow velocity to entrain or carry away contamination particles through the aerodynamic force (Fa) provided by gas flow 56. The resultant force affecting a contamination particle in a space or region, such as region 58, through which gas flow 56 is channeled and where ions are generated by output waveform 64 may be expressed as:

$$F=Fa+Fc+Fd \tag{1}$$

where, F is the resultant force on a contamination particle in a region near an emitter, such as region 58, Fa is the aerodynamic force provided by a gas flow in a gas-driven static neutralizer, and Fc and Fd are the Coulomb and dielectrophoretic forces respectively generated by the electrical field created by an output waveform 62.

Aerodynamic force Fa will move the contamination particle towards or away from the emitter surface depending upon the gas flow direction and velocity or rate. In general, aerodynamic force or drag force for turbulent gas flow (Reynolds number $R_e$>1000) is given by:

$$Fa=C_d(\pi R_p^2)(\rho u^2/2) \tag{2}$$

Where $C_d$ is the drag correction coefficient, $R_p$ is particle diameter, ρ is air or gas density and u is air or gas velocity. Aerodynamic force (Fa) has the action of driving contaminating particles away from emitter 42 and its corresponding ionizing cell 67.

At a relatively low flow velocity, highly charged contamination particles provide a Coulomb force (Fc) will dominate the aerodynamic force in the region of the ionizing cell.

$$Fc=qE \tag{3}$$

Where q is the particle charge and E is electrical field intensity created by high voltage applied to the emitter, such as output waveform 62 and emitter 42, respectively.

Dielectrophoretic force (Fd) acts on both charged and neutral (uncharged) contamination particles. For an idealized spherical neutral particle placed in corona discharge AC field, dielectrophoretic force (Fd) is given by:

$$Fd=4\pi R^3\epsilon_1\{(\epsilon_2-\epsilon_1)/(\epsilon_2+2\epsilon_1)\}E\nabla\cdot E \tag{4}$$

It is currently contemplated that, with respect to a contamination particle within a space near emitter 42, such as region 58, Coulomb force (Fc) has a magnitude that quickly reaches zero since Coulomb force (Fc) is dependent on the charge held by the contamination particle. This contamination particle, however, becomes neutralized during operation by bipolar ions, rendering the magnitude of Coulomb force (Fc) relatively trivial. Thus, the relationship between the aerodynamic and dielectrophoretic forces imparted on a given contamination particle to reduce the likelihood or rate of accumulation on an emitter may be expressed as:

$$Fa \gg Fd \tag{5}$$

$$Fd \gg Fc \tag{6}$$

where, Fa is the aerodynamic force provided by a gas flow in a gas-driven static neutralizer, and Fc and Fd are the Coulomb and dielectrophoretic forces respectively generated by the electrical field created by an output waveform 62.

Equation (1) may then be simplified to:

$$F=Fa+Fd \tag{7}$$

Keeping the average voltage of output waveform 62 at emitter 42 close to zero during each cycle of burst portion 76 will efficiently neutralize a charge (q) on a contamination particle within region 58. As this charge (q) approaches is neutralized and brought close to zero, the magnitude of Coulomb force (Fa) is also brought close to zero, satisfying condition (5).

In accordance with one embodiment of the present invention, the electric field (E) producing the dielectrophoretic force is reduced periodically for a given time duration since blow-off portion 74 occurs during each modulation portion 72. This reduction in electrical force enables gas flow 56 to carry or entrain these contamination particles, which would otherwise accumulate on emitter and resist the aerodynamic force provided by gas flow 56. In addition, providing burst portion 76 provides generates bipolar ions for contamination particle neutralization as well as for target object neutralization. Using an output waveform having burst and blow-off portions, thus provides for a static neutralizer that generates ions, which may be driven to a target object by a gas flow source, and that also reduce emitter contamination, improving the operating efficiency of the static neutralizer and minimizing the need for emitter cleaning.

The electrical field created by an output waveform, such as output waveform 62 in FIGS. 6 and 7, has a non-uniform radial intensity distribution and originates from an emitter and terminates at a reference electrode. This non-uniform radial intensity distribution may be generalized to be at a maximum when measured from the tip of the emitter, and decreases until it terminates upon reaching the closest surface of the reference electrode. For example, as illustrated in FIG. 8 and by reference also to FIGS. 6 and 7, configuring emitter 42 with an end portion in the shape of a sharp point that has a curvature radius of 0.1 mm, results in an electrical field having a field intensity distribution 86 that decreases by more than 100 times its maximum intensity when measured at a distance 88 of approximately 0.5 mm from the center of the emitter point tip during operation of static neutralizer 40.

Figure 8:
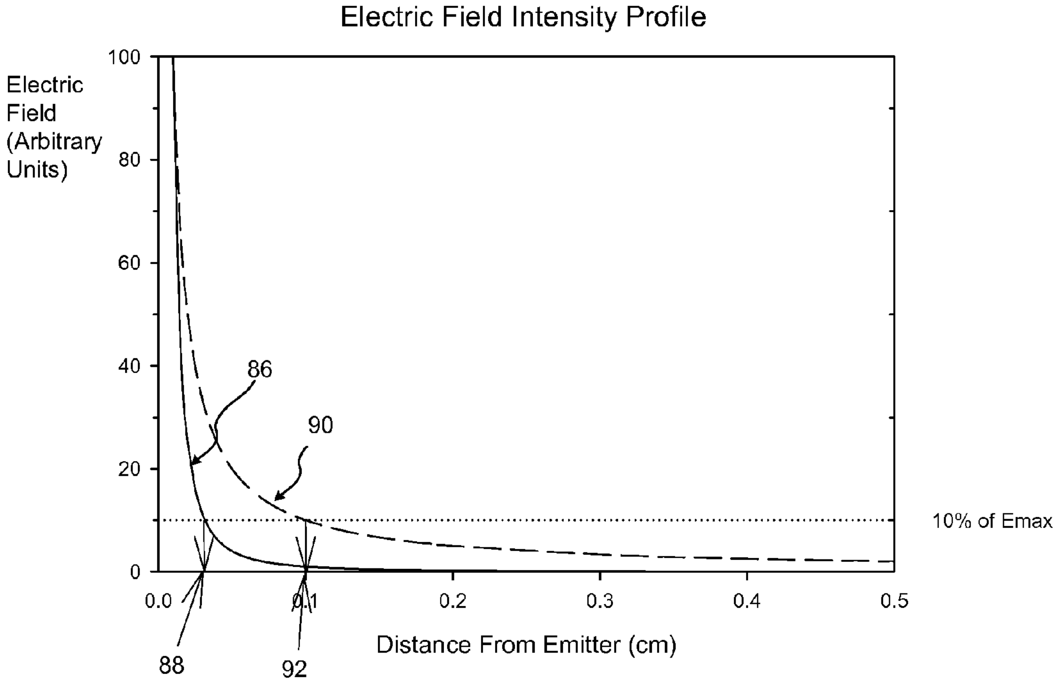
FIG. 8 illustrates a field intensity distribution profile for electrical fields created using a point-type emitter and a wire-type emitter.

FIG. 8 also illustrates an electrical field intensity distribution 90 of an electrical field created by a static neutralizer that uses an emitter in the form of a conductive filament during operation. Electrical field intensity decreases at a lower rate that the rate for a pointed electrode for a given distance from each electrode. To achieve the same 100-fold decrease in electrical field intensity distribution for a wire-type or filament emitter, requires a distance 92 of approximately 1 mm from the nearest exposed surface of the emitter. For a particular emitter and its respective reference electrode(s), the region that has a non-uniform electrical field intensity distribution, ranging from the maximum possible to 1% of its maximum is herein referred to a "high field region". For example, in FIG.

Figure 9:
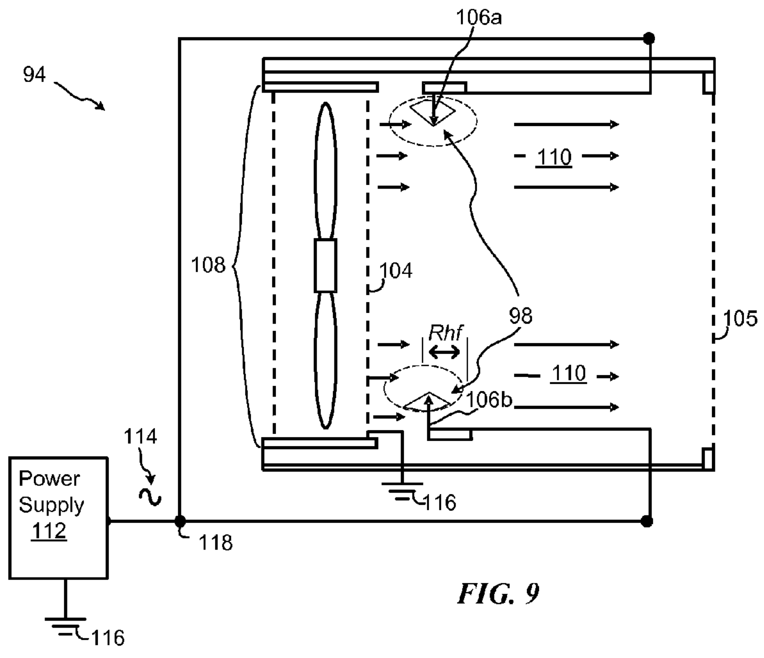
FIG. 9 illustrates a static neutralizer 94 that includes at least one reference electrode 104 that has a flat or planar surface in side view in accordance with yet another embodiment of the present invention.

6 and FIG. 9, static neutralizers 40 and 94 are shown with example high field regions 96 and 98, respectively.

Referring again to FIG. 7, burst portion 76 includes a period of time for the generation of bipolar ions and the neutralization of contamination particles, named "particle neutralization period" 100, and a period of time for the continued generation of bipolar ions, named "ionization period" 102, which are useful for target object neutralization. Particle neutralization period 100 is a process that may be characterized by the ion current generated since ion current is proportional to ion generation. Ion concentration quickly saturates in the gap between an emitter and reference electrode when the rate of ion generation and recombination are approximately equal. Contamination particle neutralization is an exponential and slower process depending on contamination particle radii, charge and concentration. Therefore, the number of cycles performed during burst portion 76 should be selected so that it provides for sufficient contamination particle neutralization. Neutralizing these contamination particles renders Coulomb force (Fc) much smaller than dielectrophoretic force (Fd) as required under expression (5), above. In accordance with one embodiment of the present invention, burst portion frequency (Fm) may be selected to be approximately between 10 and 1000 Hz and may either be fixed or adjusted in real-time. In the embodiment shown, a burst portion frequency (Fm) of approximately between 10 and 600 Hz may be used when it is under real-time control.

The time duration of blow-off portion 74 may be selected to maximize the removal of contamination particles from a region near emitter 42 that tends to have the highest concentration of contamination particles due to the effect of the dielectrophoretic force created by the generated electrical field, such as within a high field region 96 or 98 in FIG. 6 or 9, respectively. Setting non-burst amplitude 82 to zero is not intended to be limiting in any way. Any amplitude (V) value may be used that will reduce or eliminate the electrical field (E) created by output waveform 62 when it is applied to emitter so that the gas flow used and its resultant aerodynamic force (Fa) imparted on contamination particles would be sufficient to drive or entrain these contamination particles away from an emitter.

Static neutralizer 40 may be configured to provide gas flow 56 with a flow velocity (u) of 7.6 m/s. The flow velocity (u) may be selected primarily based on the distance of target object 64 and the desired bipolar ion delivery rate to target object 64. Since static neutralizer 40 uses point-type emitter (s), such as emitter 42, high field region 96 may be approximated as a sphere having a high field region radius (Rhf) of approximately 5 mm, when measured from the tip of emitter 42 to the closest surface of a reference electrode, such as reference electrode 54*a* or 54*b*. Consequently, in this example, the majority of contamination particles that would otherwise be collected by the dielectrophoretic force will be blown out of its range during the time interval (t), named "blow-off time":

$$t=2*Rhf/u=0.01/7.6=1.32\text{ ms} \quad (8)$$

Determining the blow-off time (t) for a gas flow to traverse across the entire width of high field region 96, enables burst portion frequency 80 to be selected that will enable gas flow 56 to carry away most, if not all, of the contamination particles within high field region 96. Thus, configuring power supply 46 to produce output waveform 62 with a basic frequency (Fb) of 40 KHz at a duty cycle (Dm) of fifteen percent (15%), results in a burst portion frequency (Fm) of 646 Hz, which is expressed by:

$$Fm=(1-Dm)/t=646\text{ Hz.} \quad (9)$$

where, Fm is the burst portion frequency, Dm is the duty cycle, and t is the minimum blow-off time required for a gas flow to cross a high field region at a given flow velocity. In this example, a burst portion frequency (Fm) of 646 Hz of an output waveform having a 15% duty cycle results in a burst portion duration of 232 μs. Since the basic frequency (Fb) of 40 KHz, corresponds to a 25 μs frequency period, a burst portion duration of 232 μs results in approximately 9.3 cycles of basic frequency (Fb) available for bipolar ion generation during burst portion 76. Thus, using a lower basic frequency (Fb) in this example may be impractical because a lower frequency may not provide sufficient ion generation for target object, contamination particle neutralization, or both.

At burst portion frequency above, gas flow will blow or carry away contamination particles, including those in the high field region, before they can agglomerate and attach to emitter 42. Although this burst portion frequency is believed to close to optimum, it is not intended to limit the present invention in any way. A higher burst portion frequency would not provide enough time to carry away or entrain contaminating particles, while at a lower burst portion frequency would not provide sufficient ion output.

In an alternative embodiment, static neutralizer 40 may be modified to include an emitter in the form of a filament or thin wire, named "wire-type emitter". During use, a wire-type emitter has a high intensity region that has a cylinder shape with a radius of approximately 10 mm. Using a flow velocity of 7.6 m/s for gas flow 56, results in a blow-off time (t) of 2.63 ms. Under these conditions, using an output waveform frequency of 40 KHz and a duty cycle of 15%, results in a burst-period frequency (Fm) of approximately 323 Hz. In another example, gas flow may be reduced to about 1.5 m/s, which, using equations (8) and (9) results in a lower burst-period frequency (Fm) of approximately 58 Hz. The reduced flow velocity results in a longer blow-time (t) because the lower flow velocity will take longer to purge the high field region of contamination particles.

Using a lower flow velocity, increases ion loss due to ion recombination, named "ion recombination loss", since a lower flow velocity increases the time required for the ions to reach a target object. Options to compensate of this ion recombination loss due to a lower flow velocity, may include increasing the duty cycle, increasing the output waveform amplitude (V) or both. For example, output waveform 62 in FIGS. 6 and 7, may have a duty cycle with a longer duration, higher amplitude 78, or both.

As an additional improvement to the embodiment shown in FIG. 6, static neutralizer may further include a controller 200 and a fan speed regulator 202 that is coupled to low voltage power supply 63. Controller 200 may be configured to automatically adjust the flow velocity generated by gas flow source 54 for reasons disclosed herein. In the example shown, controller 200 monitors the flow velocity, either indirectly through regulator fan speed regulator 202 if fan speed regulator is disposed to include an output signal that would enable controller 200 to determine the flow velocity of gas flow 56, or directly through a flow sensor (not shown), and then adjusts the flow velocity in real-time as required by sending a signal to fan speed regulator that increases or decreases the RPM of fan 66.

In yet another additional improvement to the embodiment shown in FIG. 6, static neutralizer 40 may further include an ion current sensor 204, an indicator 206, a grid for sensing ions, named "grid electrode" 208, or any combination of these devices. Ion current sensor 204 may be coupled between any set of reference electrodes, such as reference electrodes 44*a* and 44*b*, and a reference rail, such as ground 52. Ion current sensor 204 provides signals 210 that may be sampled by controller 200 to determine the amplitude of ion current generated by static neutralizer 40. If this ion current amplitude falls below a threshold, which may be preselected, controller 200 may send a signal to indicator 206. A low ion current may be used to indicate through indicator 206 that emitter 42 is dirty and needs cleaning or maintenance. Ion current sensor 204 may be implemented using known methods, such as methods that employ high frequency filtering, or inductive techniques.

The terms emitter and reference electrode are intended to have their respective common meaning as used in the static neutralization field. Emitter 42 has a shape suitable for generating ions by corona discharge and, in the example shown in FIG. 6, has one end in the form of a sharp point. Using a sharp point to implement emitter 42 is not intended to limit the scope of various embodiments disclosed herein. One of ordinary skill in the art would readily recognize that other shapes may be used, such as a conductive electrode in the form of a filament, thin-wire loops, and the like. The shape of reference electrodes 44*a* and 44*b*, which is in the form of a circle or semi-circle in cross-section, is also not intended to be limiting.

For example, as shown in FIG. 9, static neutralizer 94 may employ at least one reference electrode 104 that has a flat or planar surface in side view, and may have a grid pattern in front or rear view (not shown). Static neutralizer 94 may further include a grid electrode 105 and at least one emitter disposed downstream from reference electrode 104, such as emitters 106*a* and 106*b*. Static neutralizer 94 also includes a gas flow source 108 that generates gas flow 110 at a selected flow velocity, and a power supply 112 that generates an output waveform 114. Power supply 112 is coupled to a reference rail, such as ground 116, and includes an output 118 that is electrically coupled to emitters 106*a* and 106*b*. Gas flow source 108, power supply 112, and grid electrode 105 may be respectively implemented to have substantially the same function and structure as gas flow source 54, power supply 46 and grid electrode 208 in FIG. 6. Power supply 112 establishes output waveform parameters for output waveform 114 that may be similar to those of other output waveforms, such as output waveform 62 in FIG. 6. When applied to emitters 106*a* and 106*b*, output waveform 114 creates a high field region 98 that may be characterized with a radius Rhf as shown.

An output waveform disclosed as part of the present invention herein, including output waveforms 62, 114, 160, 170 and 180, may be generated using any power supply capable of generating these output waveforms, such as power supply 46 in FIG. 6. In the example in FIG. 6, power supply 46 may include an oscillator 120, a high voltage step-up transformer 122, a DAC 124, a voltage amplifier 126 and a summing device 128. Controller 200 establishes the parameters of output waveform 62, including a DC offset (Voff), the duration of a burst portion or ionization portion, the duration of a blow-off portion, the output waveform frequency (Fb), output waveform amplitude (V) and burst portion frequency (Fm).

DC offset (Voff) of output waveform 62 may need to be adjusted to control ion balance, ion current balance or both. To control ion current balance, controller 200 may sample signal 210 and use this signal to adjust DC offset (Voff), output waveform amplitude (V) or both until ion current balance is maintained. To control ion balance, controller 200 may sample grid electrode 208 and use the signal obtained from grid electrode 208 to adjust DC offset (Voff), output waveform amplitude (V) or both until ion balance is achieved. The ability of controller 200 to adjust ion current balance and ion balance is subject to the capabilities and condition of static neutralizer 40. For example, if emitter 42 has a layer of contamination particles that is sufficient to change the geometry of emitter 42, controller 200 may not have enough control range to compensate for this change in geometry. In such an event, if static neutralizer is also configured with indicator 206, controller 200 may assert a signal that may be used by indicator 206 indicate that emitter is 42 needs cleaning or maintenance.

Controller 200 may adjust the DC offset (Voff) of output waveform by sending a digital signal to DAC 124, which generates an analog signal which is used by voltage amplifier 126 to generate a signal 212 that may be used as DC offset. Signal 212 is then summed with the output of high voltage step-up transformer 122 by summing device 128 to create an output waveform.

Controller may adjust the duration of a burst portion or ionization portion, the duration of a blow-off portion, the output waveform frequency (Fb), output waveform amplitude (V), burst portion frequency (Fm) or any combination of these by sending the necessary parameters to oscillator 120. These parameters may be adjusted by controller for certain conditions, as further disclosed herein. The use of a controllable power supply in which the parameters of the output waveform may be changed by a controller is not intended to be limiting. These parameters may be established at the time of manufacture or provided through a user selectable setting or switch. High voltage step-up transformer 122 provides a step up in voltage to an oscillating output signal 214 provided by oscillator 120, resulting in a high voltage time varying signal 216. Summing device 128 sums signal 216 with signal 212 to create an output waveform.

Figure 10:
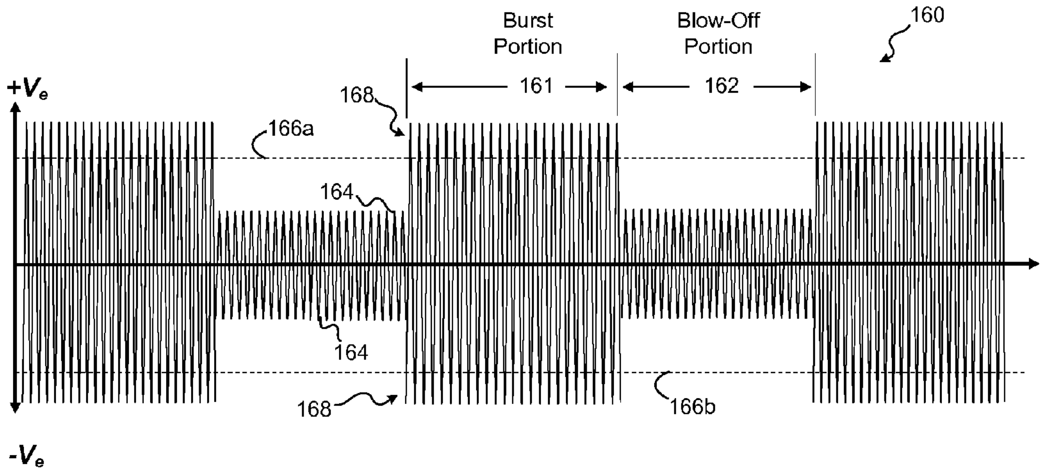
FIG. 10 illustrates an alternative example of an output waveform that may be used in a static neutralizer in accordance with a yet another embodiment of the present invention.

As illustrated in FIG. 10, power supply 46 in FIG. 6 may generate an alternative output waveform 160 that includes a burst portion 161 and a blow-off portion 162 having a non-burst amplitude 164 that is less than the corona onset thresholds 166*a* and 166*b* for emitter 42 but more than zero volts. Like amplitude 78 in FIG. 7, amplitude 168 exceeds a corona onset threshold, such as corona onset thresholds 166*a* and 166*b*. In this example, output waveform 160 reduces the transient current load imposed on power supply 46 by reducing the size difference between non-burst amplitude 164 and amplitude 168. In addition, the reduction in the size of non-burst amplitude 164 results in a disproportionately greater reduction in the dielectrophoretic force (Fd) created by the electrical field resulting from the application of output waveform 160 on emitter 42. In essence, as expressed in equations (4) and (10) below, dielectrophoretic force (Fd) is inversely proportional to the square of the voltage amplitude (P) providing an electrical field (E), which in this example is non-burst amplitude 164.

$$F_d \propto V^2 \quad (10)$$

where Fd is the dielectrophoretic force created by the electrical field (E) and V is the amplitude (V) of output waveform 160, such as non-burst amplitude 164.

Output waveform 160 may be useful in cases where a flow velocity exists through the gap between emitter(s) and reference electrode(s), such as gaps 60*a* and 60*b* in FIG. 6, that is sufficient to carry away contamination particles even though output waveform 160 may be providing a non-burst amplitude (V) that generates a dielectrophoretic force (Fd) that is smaller than the dielectrophoretic force (Fd) that would have otherwise been created during burst portion 161.

Moreover, selecting a relatively high mean (RMS) for non-burst amplitude 164, may enable the generation of positive and negative ions using a regular burst portion frequency (Fm), such as 646 Hz, at a relatively low output waveform frequency (Fb) with a relatively short duty cycle, such as 15%. This will decrease ion recombination by separating the positive and negative polarity ion clouds that leave the gap for the target object, and will reduce contamination particle accumulation by providing adequate time for a gas flow to blow or carry away the contamination particles. Also, using a short duty cycle reduces ozone generation and decreases power consumption dramatically.

Figure 11:
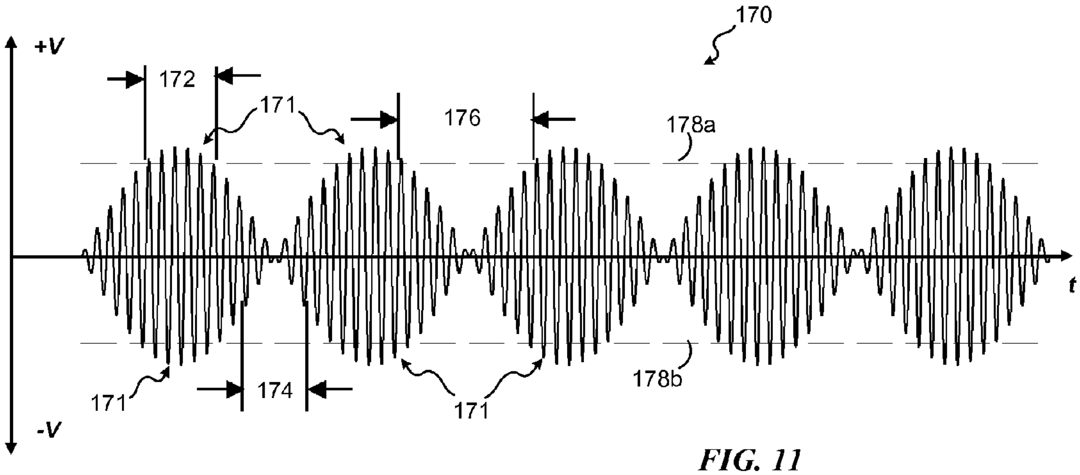
FIG. 11 illustrates an alternative example of an output waveform that may be used in a static neutralizer in accordance with a yet still another embodiment of the present invention.

In accordance with another embodiment of the present invention, FIG. 11 illustrates an output waveform 170 that may be generated by a power supply used by an AC gas flow driven static neutralizer, such as power supply 46 and static neutralizer 40, respectively, in FIG. 6. Output waveform 170 may be used in operating conditions where target object 64 is located at a distance relatively close to static neutralizer 40 and the flow velocity of gas flow 56 in a region, such as region 58, between ion emitter and reference electrode is rather slow. For example, target object 64 may be located at a distance that is between approximately one and 10 multiples of the gap between an emitter and the closest conductive surface of a reference electrode, such gap 60 or gap 60*b*. In another example, a low flow velocity may be defined as a flow velocity having a velocity between 0.1 and 1.0 m/s.

Output waveform 170 that includes an ionization portion 172, a blow-off portion 174, and a non-ionization portion 176. During ionization portion 172, output waveform 170 has an ionization amplitude 171 that exceeds the corona onset threshold for static neutralizer 40, such as corona onset thresholds 178*a* and 178*b*. Ionization portion 172 is similar to burst portion 76 and 161 with respect to the fact that during their duration, an output waveform has an amplitude (P) that exceeds the corona onset thresholds for a particular emitter. Ionization amplitude 171, however, varies in voltage during ionization portion 172 but does not fall below corona onset thresholds 178*a* and 178*b*.

As ionization amplitude 171 alternates and exceeds a respective corona threshold voltage, a bipolar ion cloud is generated, and a dielectrophoretic force (Fd) generated by output waveform 170 starts attracting and collecting contamination particles suspended in a gas, such as air, surrounding emitter 42. When output waveform 170 exits ionization portion 172 and its output waveform amplitude (P) decreases, the dielectrophoretic force (Fd) quickly decreases at rate inversely proportional to the square of the output waveform amplitude (V), rendering dielectrophoretic force (Fd) close to zero when output waveform amplitude (V) approaches zero volts. Once an aerodynamic force (Fa), which is provided by gas flow 56, exceeds (Fd), as expressed by equation (2), gas flow 56 begins to carry away contamination particles which may be in a region near emitter 42, such as region 58, away from region 58 and from emitter 42 and its corresponding ionization cell 67.

Ionization portion 172 may be selected to occur at a modulation frequency (Fm) approximately between 0.1 and 100 Hz. A modulation frequency within this frequency range, causes the average amplitude (V) applied to emitter 42 to change relatively slowly, providing sufficient time for gas flow 56 to blow-off or carry away contamination particles with region 58. In addition, any swing voltage induced on target object 64 is relatively small. In addition, blow-off portion 174 may have a slightly shorter duration than non-ionization portion 176.

Figure 12:
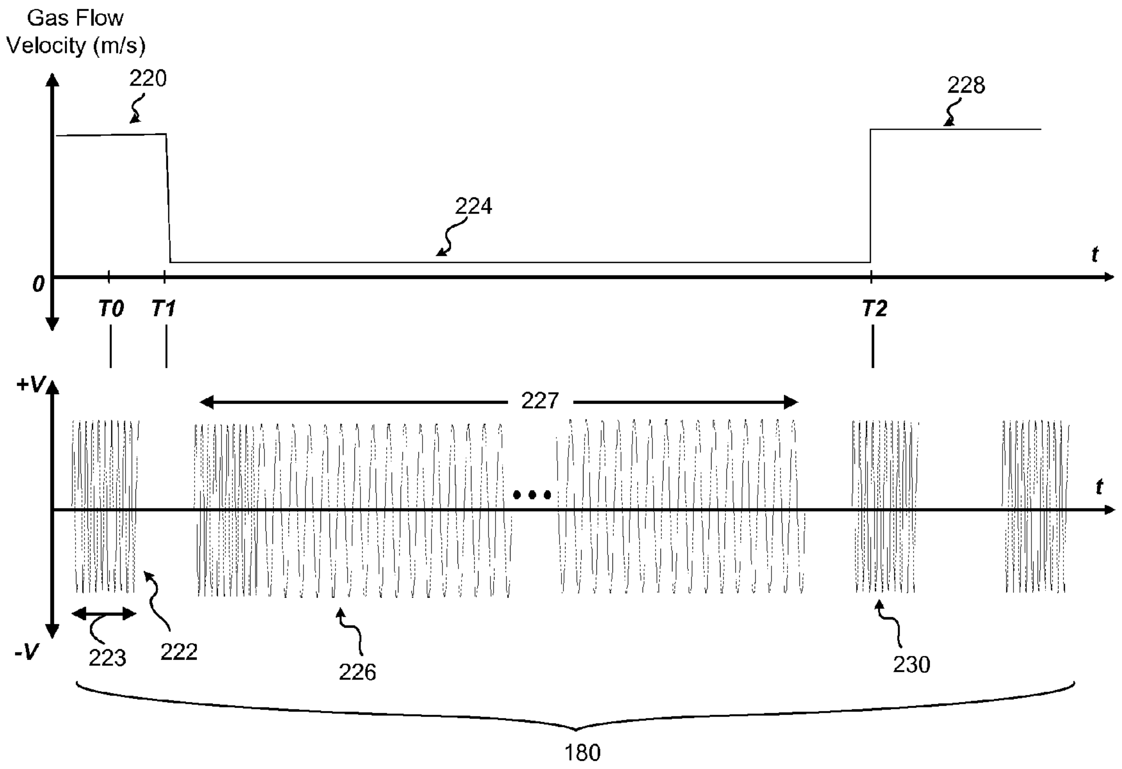
FIG. 12 illustrates an example output waveform that is adjusted by a power supply used by an AC gas flow driven static neutralizer over a given time period in response to changes in flow velocity, in accordance with yet another embodiment of the present invention.

FIG. 12 illustrates an output waveform 180 that is adjusted by a power supply used by an AC gas flow driven static neutralizer, such as power supply 46 and static neutralizer 40, respectively, in FIG. 6. The parameters of output waveform 180 are changed in response to a change in the flow velocity generated by gas flow source 54 over a given time period. Output waveform 180 may be used in operating conditions where variations in flow velocity exist. The flow velocity may be monitored and adjusted using an embodiment of static neutralizer 40 that includes controller 200, fan speed regulator 202 and low voltage power supply 63.

For example, at time T0, static neutralizer 40 is operating at a given flow velocity 220 and at a given output waveform having a given set of output waveform parameters 222, including a duty cycle (Dm) for a given duty cycle duration 223. At T1, flow velocity 220 of gas flow 56 decreases to a flow velocity 224, causing controller 200 to change output waveform parameter(s) 222 to output waveform parameters 226, such as by decreasing the output waveform frequency (Fb), increasing the duty cycle (DM) to a duration of 227, or both. At time T2, flow velocity 224 increases to flow velocity 228, causing controller 200 to change output waveform parameter(s) 226 to output waveform parameter(s) 230, such as by increasing the output waveform frequency (Fb), the burst portion frequency (Fm), or both.

In general, using a relatively high output waveform frequency (Fb) for an output waveform, including output waveform 62, 114, 160, 170, and 180 above, provides some leeway to use a relatively short duration for a burst portion of the output waveform. For example, a duty cycle of 10% or less may be used, depending on operating conditions. In the embodiment shown, burst portion frequency (Fm), burst portion duration, and duty cycle (Dm) are variable and may be based on or defined by the flow velocity of gas flow source 54, distance of the ion generation region to target object 64, the required ion concentration for neutralization efficiency, or any combination of these parameters. Therefore, it is a trade off between having a long period between emitter cleaning, named "cleaning cycle period", and the value of the ion current. This cleaning cycle period depends on the cleanliness of the gas used, the operating environment, or both, while the ion current value depends, among other things; on the target object characteristics, including its amount of charge, movement velocity and distance to the static neutralizer. Selecting a low duty cycle decreases ozone and nitrogen oxides caused by corona discharge.

Figure 13:
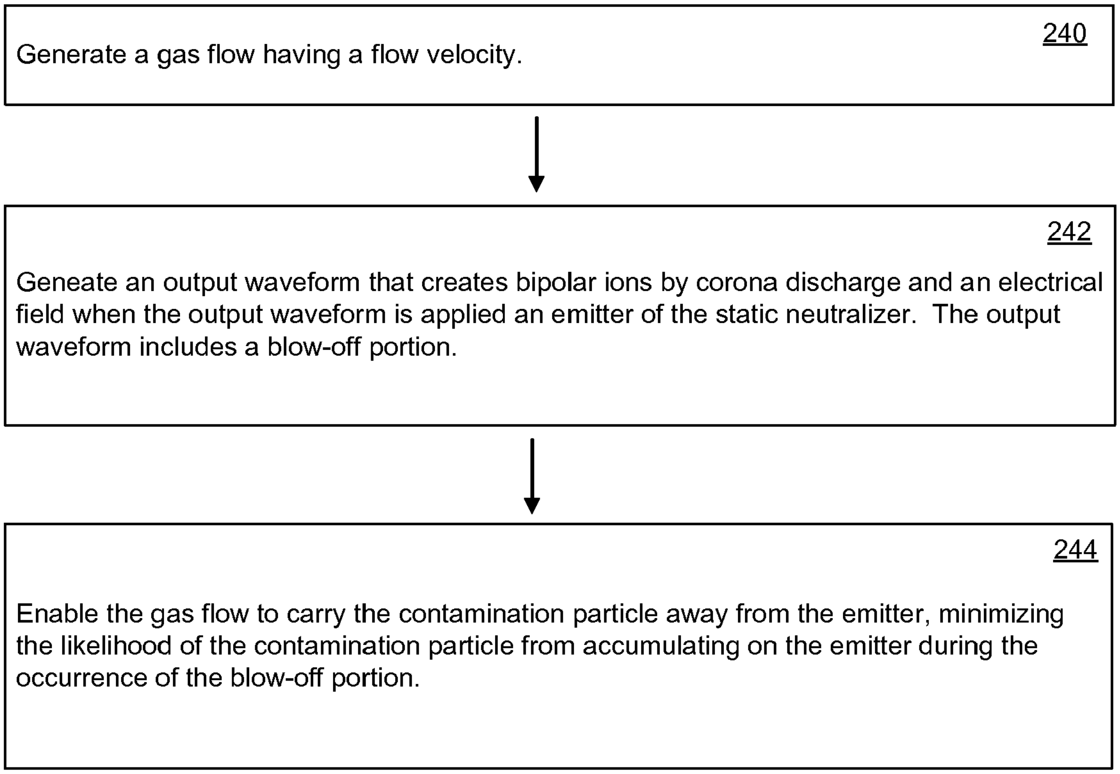
FIG. 13 illustrates a method of limiting emitter contamination in an AC gas flow driven static neutralizer in accordance with another embodiment of the present invention.

Referring now to FIG. 13, a method of limiting emitter contamination in an AC gas flow driven static neutralizer is shown in accordance with another embodiment of the present invention.

Using an AC gas-flow driving static neutralizer, such as static neutralizer 40 or 94, a gas flow having a flow velocity is provided or generated 240.

An output waveform is generated 242. The output waveform creates bipolar ions by corona discharge and an electrical field when the output waveform is applied an emitter of the static neutralizer. This output waveform may have the output waveform parameters disclosed above for output waveforms 62, 114, 160, 170 and 180, which are hereinafter referred to as the "disclosed waveforms". This electrical field results in an electrical forces referred to herein as dielectrophoretic force (Fd) that attracts a gas-borne contamination particle that may be within a region surrounding the emitter. The output waveform includes an output waveform amplitude, an output waveform frequency, a burst portion and a blow-off portion, which may be substantially similar to the output waveform amplitude, an output waveform frequency, a burst portion and a blow-off portion of any of the disclosed waveforms.

The gas flow, such as gas flow 56 in FIG. 6, is then enabled 244 to carry the contamination particle away from the emitter, minimizing the likelihood of the contamination particle from accumulating on the emitter during the occurrence of the blow-off portion.

Enabling the gas flow to carry the contamination particle away in step 244 may include decreasing the dielectrophoretic force (Fd) by decreasing the output waveform amplitude during the blow-off portion. In the embodiment shown, the flow velocity is selected before decreasing dielectrophoretic force (Fd) although this order is not intended to be limiting.

As an alternative or in addition to decreasing the waveform amplitude during the blow-off portion, step 244 may include decreasing the duty cycle of the modulation portion.

In yet another alternative or in addition to decreasing the waveform amplitude during the blow-off portion, step 244 may include adjusting the burst portion frequency, the burst portion duration, duty cycle or any combination of these in response to a set of parameters that includes the flow velocity, a required ion concentration, a distance between an ion generation region and a target object, region 58 and target object 64 in FIG. 6, respectively.

In addition, as a further improvement to step 244, flow velocity may be monitored, such as disclosed above with respect to controller 200, fan speed regulator 202, low voltage power supply 63 and gas flow source 54 in FIG. 6. If flow velocity decreases, the duty cycle, output waveform frequency (Fb) or both may also be decreased so that the gas flow can still carry away the contamination particle during the blow-off period. Alternatively, if flow velocity increases, the output waveform frequency, burst portion frequency, or both may be increased since a higher flow velocity may still permit condition (5) to be met.

In addition, enabling the gas flow to carry the contamination particle away in step 244, may include determining the gas flow velocity within region 58 surrounding emitter 42, and changing the during of the blow-off period of the output waveform based on the measured gas flow velocity for a given emitter geometry and output waveform amplitude during the blow-off period. Determining the gas flow velocity may include either measuring the gas flow directly or calculating the gas flow indirectly, such as by using controller 200 and fan speed regulator 202, as disclosed above with respect to FIG. 6.

While the present invention has been described in particular embodiments, it should be appreciated that the present invention should not be construed as limited by such embodiments. Rather, the present invention should be construed according to the claims below.

We claim:

1. A low maintenance AC gas flow driven static neutralizer, comprising:

an emitter and a first reference electrode;

a power supply having an output electrically coupled to said emitter and a reference terminal electrically coupled to said first reference electrode, said power supply disposed to produce an output waveform that creates ions by corona discharge and an electrical field when said output waveform is applied to said emitter;

a gas flow source disposed to produce a gas flow across a first region that includes said ions and said emitter, said gas flow having a flow velocity;

wherein, during a first time duration, said output waveform decreases an electrical force created by said electrical field, enabling said gas flow to carry away from said emitter a contamination particle that may be located within a second region surrounding said emitter, and to minimize a likelihood of said contamination particle from accumulating on said emitter; and wherein, said output waveform also causing said ions to be arranged into a bipolar ion cloud that alternates between said emitter and said first reference electrode, and said electrical field to vary in amplitude over time and intensity.

2. The static neutralizer of claim 1, wherein:

said second region is a subset of said first region and said output waveform includes a modulation portion having a modulation portion duration; and said first time duration is less than said modulation portion duration.

3. The static neutralizer of claim 1, wherein:

said second region includes a high field region; and said electrical field having a maximum value nearest to a surface of said emitter; and wherein said high field region is a volume of space that has a radius measured from said surface to a point in space that has an electrical field intensity of no less than one percent of said maximum value.

4. The static neutralizer of claim 3, further comprising a controller disposed to regulate said flow velocity so that said gas flow imparts an aerodynamic force sufficient to carry said contamination particle away from said emitter during said first time duration; and wherein said gas flow further including a flow direction that causes said gas flow to pass through said high field region.

5. The static neutralizer of claim 1, wherein:

said first time duration is periodic; and said output waveform produces a dielectrophoretic force that affects said contamination particle, and includes a burst portion that has an amplitude sufficient for causing said corona discharge when applied to said emitter.

6. The static neutralizer of claim 5, wherein said output waveform further includes a blow-off portion that has a blow-off portion duration equal to said first time duration.

7. The static neutralizer of claim 6, wherein:

wherein said gas flow imparts an aerodynamic force on said contamination particle; and further including a controller disposed to adjust an amplitude of said output waveform so that during said blow-off portion said aerodynamic force exceeds said dielectrophoretic force.

8. The static neutralizer of claim 7, wherein said adjustment of said amplitude by said controller includes decreasing an amplitude of said basic waveform during said blow-off portion.

9. The static neutralizer of claim 5, wherein:

wherein said gas flow imparts an aerodynamic force on said contamination particle; and further including a controller disposed to adjust an amplitude of said output waveform so that during said blow-off portion said aerodynamic force exceeds said dielectrophoretic force.

10. The static neutralizer of claim 5, wherein:

said electrical field originates from an emitter surface of said emitter, said electrical field having a maximum field intensity value nearest to said emitter surface; and said high field region is a volume of space that has a radius measured from said surface to a point in space that has a field intensity of no less than one percent of said maximum value field intensity value.

11. The static neutralizer of claim 10, wherein said gas flow has a flow velocity and said first time duration is selected as:

$$t>2R_{hf}/u$$

where t is said time period, $R_{hf}$ is said radius and u is said gas flow velocity.

12. The static neutralizer of claim 11, wherein said output waveform includes a duty cycle, and a burst frequency during said burst period, said burst frequency is selected as $$Fm=(1-Dm)/t$$

where Fm is said burst frequency, Dm is said duty cycle, and t is said time period.

13. The static neutralizer of claim 1, further comprising:

a grid electrode, and an ion current sensor;

wherein said gas flow source includes a fan controlled by a fan speed regulator, said fan speed regulator disposed to include an output that provides a signal which is useable for estimating said gas flow velocity; and a controller disposed to regulate said flow velocity so that said gas flow imparts a force sufficient to carry said contamination particle away from said emitter during said first time duration; and wherein said controller is disposed to measure ion balance by using said grid electrode, and to determine ion current generated during operation of the static neutralizer by using said ion current sensor.

14. The static neutralizer of claim 1:

further including a controller; and wherein said power supply further includes:

an oscillator having an output coupled to a step up voltage transformer, said transformer coupled to a summing device;

a DAC coupled to a voltage amplifier, said voltage amplifier including an output that is coupled to said summing device;

wherein said controller is coupled to said DAC and said oscillator;

wherein said summing device includes an output coupled to said emitter; and wherein said controller disposed to regulate said flow velocity so that said gas flow imparts a force sufficient to carry said contamination particle away from said emitter during said first time duration.

15. A low maintenance AC gas flow driven static neutralizer, comprising:

an emitter and a first reference electrode;

a power supply having an output electrically coupled to said emitter and a reference terminal electrically coupled to said first reference electrode, said power supply disposed to produce an output waveform that creates ions by corona discharge and an electrical field when said output waveform is applied to said emitter;

a gas flow source disposed to produce a gas flow across a first region that includes said ions and said emitter, said gas flow having a flow velocity;

wherein, during a first time duration, said output waveform decreases an electrical force created by said electrical field, enabling said gas flow to carry away from said emitter a contamination particle that may be located within a second region surrounding said emitter, and to minimize a likelihood of said contamination particle from accumulating on said emitter; and further comprising a second reference electrode; and wherein said emitter and said first and second reference electrodes are part of an ionizing cell.

16. A method of limiting ion emitter contamination in an AC gas flow driven static neutralizer, the method comprising:

providing a gas flow having a flow velocity;

generating an output waveform that creates bipolar ions by corona discharge and an electrical field when said output waveform is applied an emitter of the static neutralizer, said electrical field resulting in an electrical force that attracts a gas-borne contamination particle that may be within a region surrounding said emitter, and said output waveform including an output waveform amplitude, an output waveform frequency, a burst portion and a blow-off portion; and enabling said gas flow to carry said contamination particle away from said emitter and to minimize a likelihood of said contamination particle from accumulating on said emitter during said blow-off portion.

17. The method of 16, wherein said enabling includes decreasing said electrical force by decreasing said output waveform amplitude during said blow-off portion.

18. The method of claim 17, further including selecting said flow velocity before decreasing said electrical force.

19. The method of 16, wherein:

said burst portion includes a burst portion duration and said blow-off portion includes a blow-off portion duration; and said burst portion duration divided by a sum of said burst portion duration and blow-off portion duration equals a duty cycle for said output waveform.

20. The method of claim 19, wherein said enabling further includes decreasing said duty cycle.

21. The method of 19, wherein said enabling includes:

determining said gas flow velocity within said region; and changing said blow-off period duration based on said gas flow velocity and said output waveform amplitude.

22. The method of claim 19, wherein:

said output waveform further includes a modulation portion, said modulation portion including said burst portion and said blow-off portion, and a burst portion frequency; and said enabling further includes adjusting any one of said burst portion frequency, burst portion duration, and duty cycle in response to a set of parameters.

23. The method of claim 22, wherein said set of parameters includes said flow velocity.

24. The method of claim 22, wherein said set of parameters includes a distance between an ion generation region and a target object.

25. The method of claim 22, wherein said set of parameters includes a required ion concentration.

26. The method of 22, wherein said enabling includes decreasing said duty cycle if said flow velocity decreases.

27. The method of 22, wherein said enabling includes increasing said output waveform frequency if said flow velocity increases.

28. The method of 16, wherein said enabling includes decreasing said output waveform frequency if said flow velocity decreases.

29. The method of 16, wherein said enabling includes increasing said burst portion frequency if said flow velocity increases.

* * * * *